R. Chadwick,
Cage Trap,
N°32,961.   Patented July 30, 1861.
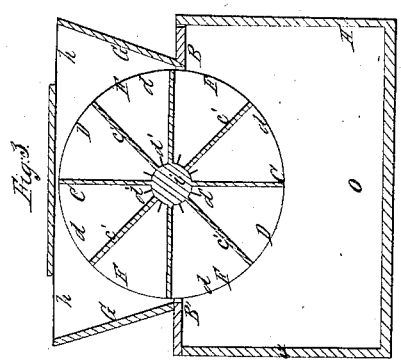
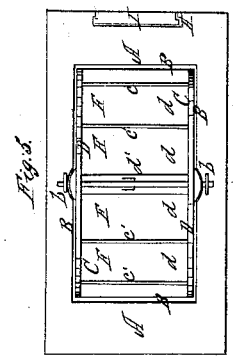
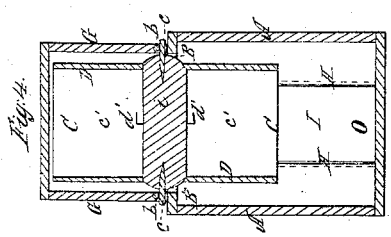
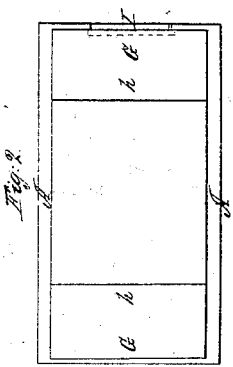
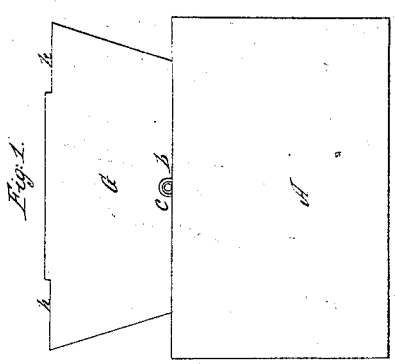
Witnesses:
George Cove
William Barney
Inventor:
Reuben Chadwick

UNITED STATES PATENT OFFICE.

REUBEN CHADWICK, OF NANTUCKET, MASSACHUSETTS.

ANIMAL-TRAP.

Specification of Letters Patent No. 32,961, dated July 30, 1861.

*To all whom it may concern:*

Be it known that I, REUBEN CHADWICK, of Nantucket, in the county of Nantucket and State of Massachusetts, have invented a new and useful or Improved Self-Setting Trap; and I do hereby declare the same to be fully described in the following specification and represented in the accompanying drawings, of which—

Figure 1, denotes a side elevation. Fig. 2, a top view. Fig. 3, a vertical and central section of my improved trap. Fig. 4, is a transverse section taken through the shaft of the revolving wheel to be hereinafter described.

The nature of my invention consists in an improved self setting trap, the same having its entering chamber, its series of baiting chambers and its receiving chamber or prison so combined and arranged as to operate in manner as hereinafter set forth.

In the drawings A, denotes a rectangular box in whose upper surface a long rectangular slot or opening B, is made, the same being for the reception of a drum or wheel C. The journals $c$, $c$, of the shaft $i$, of the said wheel is supported in bearings $b$, $b$, arranged on the top of the box A. This wheel is composed of two disks D, D, each of whose diameters is a little less than the length of the opening B, the width of such wheel being a little less than the width of the said opening. From the shaft $i$, a series of radial arms $c'$, $c'$, $c'$, etc., are made to project the same being formed of flat pieces of wood and made to extend from the said shaft to the periphery of the two disks and from side to side of the said disk as shown in Fig. 5, which represents a top view of the said wheel and its supporting box. Each of the spaces $d$, thus formed by any two adjacent arms $c'$, $c'$, and the two sides of the disks D D, constitute a baiting chamber F. Within each of the said chambers a hook $d'$, is disposed the same being for the purpose of enabling a person to tie or attach a piece of cheese or other bait to such hook. The said wheel C, should be constructed of a light material so that the weight of a rat or mouse or other small animal when brought to bear upon any one of the revolving platforms or radial arms $c'$, will readily cause such wheel to be put in revolution and of course carry the animal forward into the receiving chamber or prison O.

G denotes the entering chamber, the same being of a frusto pyramidal form as seen in Fig. 1, open at the bottom and resting on top of the chamber A, such entering chamber being made to surround one half of the wheel C. The top of the said chamber has two entrance passages $h$, $h$, formed in it, as shown in Fig. 2. The height of this chamber should be such that the mouse or animal to be entrapped cannot hold to the edge of such chamber with his hind feet while his front feet may rest on one of the radial arms or platforms $c'$.

For the purpose of enabling the rats, mice or other animals which may be caught, to be taken from the trap or prison chamber, I construct an opening or port H, and cover the same with a slide I.

A trap constructed in the above described improved manner has been found in practice to operate to excellent advantage.

I do not claim a trap constructed as described and claimed in either of the United States Patents No. 12,125 or 19,353; but

I claim—

My improved trap having its entering chamber G, its series of baiting chambers F, and its receiving chamber O, constructed and arranged with respect to each other and so as to operate together as described.

REUBEN CHADWICK.

Witnesses:
GEORGE COBB,
WILLIAM BARNEY.